United States Patent [19]

Vriezen et al.

[11] Patent Number: 4,928,222

[45] Date of Patent: May 22, 1990

[54] ENHANCED SEMAPHORE ARCHITECTURE

[75] Inventors: John J. Vriezen, Zumbrota, Minn.; Robin N. Niemeyer, Eau Claire, Wis.

[73] Assignee: International Business Machines Corporation, Armonk, N.Y.

[21] Appl. No.: 265,088

[22] Filed: Oct. 31, 1988

[51] Int. Cl.$^5$ .............................................. G06F 9/46
[52] U.S. Cl. ................... 364/200; 364/231.4; 364/231.6; 364/244; 364/244.3; 364/280; 364/281.3; 364/281.7
[58] Field of Search .................. 364/200, 300, 900

[56] References Cited

U.S. PATENT DOCUMENTS

| | | | |
|---|---|---|---|
| 4,297,743 | 10/1981 | Appell et al. | 364/200 |
| 4,316,245 | 2/1982 | Luu et al. | 364/200 |
| 4,320,451 | 3/1982 | Bachman et al. | 364/200 |
| 4,369,494 | 1/1983 | Bienvenu et al. | 364/200 |
| 4,374,409 | 2/1983 | Bienvenu et al. | 364/200 |
| 4,380,798 | 4/1983 | Shannon et al. | 364/200 |
| 4,395,757 | 7/1983 | Bienvenu et al. | 364/200 |
| 4,412,285 | 10/1983 | Neches et al. | 364/200 |
| 4,594,657 | 6/1986 | Byrns | 364/200 |
| 4,722,048 | 1/1988 | Hirsch et al. | 364/200 |
| 4,725,946 | 2/1988 | Prange et al. | 364/200 |
| 4,754,398 | 6/1988 | Pribnow | 364/200 |
| 4,780,822 | 10/1988 | Miller | 364/200 |
| 4,805,106 | 2/1989 | Pfeifer | 364/200 |

OTHER PUBLICATIONS

Tanenbaum, Structured Computer Organization, 1976, pp. 242-245.
IBM Technical Disclosure Bulletin, vol. 23, No. 10, Mar. 1981, pp. 4654-4657.

Primary Examiner—Raulfe B. Zache
Attorney, Agent, or Firm—Curtis G. Rose

[57] ABSTRACT

An enhanced semaphore architecture, referred to herein as a "fullphore", combines the "P" and "V" operations of a semaphore into a single "S" operation capable of handling both consumer processes and producer processes. A fullphore has a count, a limit, a queue for waiting processes, a wait permitted flag, and a operation flag. The operation flag determines whether the count is incremented or decremented by one. The architecture of the fullphore "S" operation is s(F,OP, WAIT_PERMITTED), where F is the fullphore to be operated on, OP is +1 for a producer process and −1 for a consumer process, and WAIT_PERMITTED is YES if the process will wait if necessary and NO if it will not.

4 Claims, 2 Drawing Sheets

S(F,OP, WAIT_PERMITTED) FULLPHORE SIGNAL OPERATION

P(S,WAIT_PERMITTED) SEMAPHORE CAPTURE OPERATION

V(S) SEMAPHORE SIGNAL OPERATION

S(F,OP, WAIT_PERMITTED) FULLPHORE SIGNAL OPERATION

ENHANCED SEMAPHORE ARCHITECTURE

FIELD OF THE INVENTION

This invention relates to the data processing field. More particularly, this invention is an enhanced semaphore architecture, referred to herein as a "fullphore", for efficiently enforcing mutual exclusion between a plurality of tasks in a multiprocessing computer system.

BACKGROUND OF THE INVENTION

A typical multiprocessing computer system has the capability to perform several tasks in parallel. However, some mechanism must be used to synchronize these parallel processes so that invalid results or race conditions do not occur. Traditionally, semaphores have been used to satisfy this synchronization requirement. The traditional semaphore known to those of skill in the art consists of a count, a limit, and a queue for tasks to wait on. Two types of semaphore instructions are required for normal operation. A "V" type of semaphore instruction is used by a "producer" process when it has produced information for use by a "consumer" process. A "P" type of semaphore instruction is used by a "consumer" process when it requests information produced by a "producer" process. The "P" operation is used to enter mutual exclusion, while the "V" operation is used to exit mutual exclusion. The traditional semaphore is described in more detail in "Structured Computer Organization" by Andrew Tanenbaum, Section 5.33, incorporated herein by reference. U.S. Pat. No. 4,320,451 also describes the semaphore and is also incorporated herein by reference.

An analogy of the semaphore operation is helpful to explain its operation. Imagine it is Halloween, it is just getting dark, and Harry the Homeowner has just filled up a candy dish with 3 pieces of candy. The candy dish is just big enough for 3 pieces of candy. Harry doesn't want to be bothered by trick or treaters all night, so he leaves the candy dish out on the porch next to the porch swing with a sign that says the following: "Take one piece of candy from the candy dish. If the candy is all gone, you may sit on the porch swing and wait for the dish to be refilled if you want to." At the start of the evening, all 3 pieces of candy are available to be consumed (count=3) and are stored in the candy dish (limit=3). Each of the trick or treaters (processes) is capable of taking a piece of candy from the candy dish (consumer process) independent of the actions of the other trick or treaters (multiprocessing system). Harry is capable of refilling the candy dish with more candy (producer process).

When the first trick or treater wants a piece of candy, he takes one from the candy dish (consumer process). There are now two pieces of candy available (count=2). When 2 more trick or treaters want a piece of candy, they each take one from the candy dish. Now there are 0 pieces of candy available (count=0). If a 4th trick or treater wants a piece of candy, he cannot get one (since count=0) until Harry adds a piece of candy to the candy dish (incrementing the count to 1). If this fourth trick or treater can wait, he sits down on the porch swing and waits for Harry to refill the candy dish (count=−1 indicating one trick or treater waiting for a piece of candy). When Harry adds another piece of candy to the candy dish the waiting trick or treater takes it (count incremented to 0). If this fourth trick or treater cannot wait, he dejectedly moves on to the next house (consumer request fails).

Harry thought that putting the candy dish out on the porch would give him some peace and quiet on Halloween, but he finds himself running out to the porch every few minutes to refill the candy dish. Harry figures out that he could be much more efficient if he could put some extra candy down in the porch swing next to the candy dish, where it would wait for the next trick or treater to take a piece of candy (count=4 indicating one piece of candy waiting for a trick or treater). Harry is told by the Halloween Advisory Commission that he cannot do this, because the rules do not allow it.

The above analogy shows one of the problems with the traditional semaphore architecture. Because the count cannot exceed the limit, "V" type semaphore instructions fail if the count is equal to the limit. Therefore a "producer" process cannot wait for a "consumer" process if the count is equal to the limit. This failure makes the "V" type semaphore instruction asymmetrical with the "P" type instruction, which permits a consumer process to wait for a producer process. This asymmetrical nature between the P and V instructions means that both are necessary in a normal multiprocessing environment. This requirement complicates the operational interface between the semaphore and the processors of the multiprocessing system.

SUMMARY OF THE INVENTION

It is a principal object of the invention to provide an enhanced semaphore architecture where only one instruction is needed to handle both producer processes and consumer processes.

It is another object of the invention to provide an enhanced semaphore architecture where a producer process is permitted to wait for a consumer process if the count is greater than or equal to the limit.

These and other objects are accomplished by the enhanced semaphore architecture disclosed herein.

An enhanced semaphore architecture, referred to herein as a "fullphore", combines the "P" and "V" operations of a semaphore into a single "S" operation capable of handling both consumer processes and producer processes. A fullphore has a count, a limit, a queue for waiting processes, a wait permitted flag, and a operation flag. The operation flag determines whether the count is incremented or decremented by one. The architecture of the fullphore "S" operation is s(F,OP, WAIT_PERMITTED), where F is the fullphore to be operated on, OP is +1 for a producer process and −1 for a consumer process, and WAIT_PERMITTED is YES if the process will wait if necessary and NO if it will not.

When a fullphore receives a consumer process request (indicated by OP=−1), it first checks to see if the count is less than or equal to zero. If so, the request fails unless the WAIT_PERMITTED flag was YES. If the WAIT_PERMITTED flag was YES, OP (−1) is added to the count, thereby decrementing the count. The process waits on the wait queue until dispatched by a producer process. If the count is not less than or equal to zero, and in addition the count does not exceed the limit, OP (−1) is added to the count, thereby decrementing the count, and the request completes successfully. If the count is greater than the limit, indicating a waiting producer process, the waiting producer process is dispatched, OP (−1) is added to the count, and both processes' requests are allowed to complete successfully.

When a fullphore receives a producer process request (indicated by OP = +1), it first checks to see if the count is greater than or equal to the limit. If so, the request fails unless the WAIT_PERMITTED flag was YES. If the WAIT_PERMITTED flag was YES, OP (+1) is added to the count, thereby incrementing the count. The process waits on the wait queue until dispatched by a consumer process. If the count is not greater than or equal to the limit, and in addition the count is not less than zero, OP (+1) is added to the count, thereby incrementing the count, and the request completes successfully. If the count is less than zero, indicating a waiting consumer process, the waiting consumer process is dispatched, OP (+1) is added to the count, and both processes' requests are allowed to complete successfully.

DESCRIPTION OF PREFERRED EMBODIMENT

Figure 1:
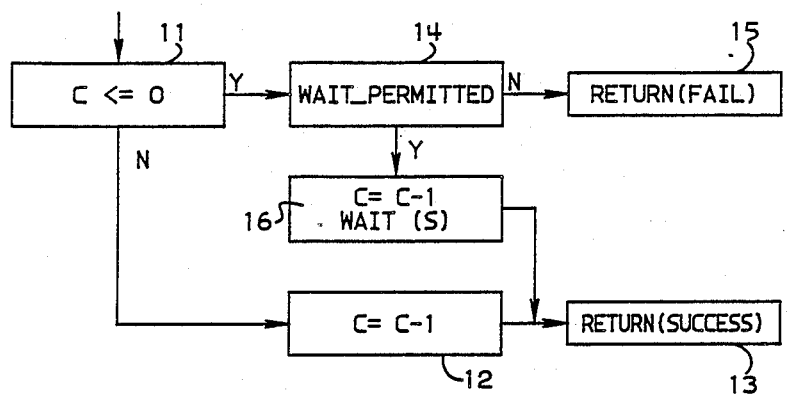
FIG. 1 shows a block diagram of the prior art semaphore P operation.

FIG. 1 shows a block diagram of the prior art semaphore P operation used by consumer processes (also known as consumer tasks). The architecture of the P operation is p(S,WAIT_PERMITTED), where S is the semaphore to be operated upon and WAIT_PERMITTED is a flag used to indicate if the process will wait or not if it cannot be completed. When a P operation is received by the semaphore, block 11 checks to see if count C is less than or equal to zero. If not, the count is decremented in block 12 and the request succeeds in block 13. If so, block 14 checks to see if the WAIT_PERMITTED flag was YES or NO. If the flag was NO, the request fails in block 15. If the flag was YES, the count is decremented by one in block 16 and the process waits on the wait queue until dispatched by a producer process.

Figure 2:
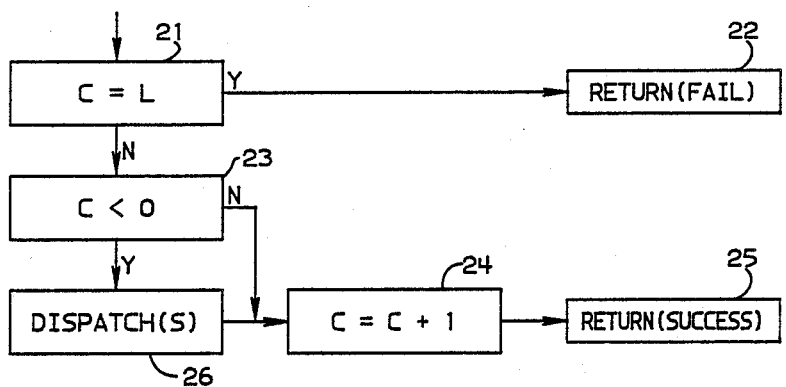
FIG. 2 shows a block diagram of the prior art semaphore V operation.

FIG. 2 shows a block diagram of the prior art semaphore V operation used by producer processes (also known as producer tasks). The architecture of the V operation is v(S), where S is the semaphore to be operated upon. When a V operation is received by the semaphore, block 21 checks to see if count C is equal to limit L. If so, the request fails in block 22. Note that the process is not permitted to wait for the count to be less than limit L—automatic failure of the request is the only possible result.

If the count is not equal to L, block 22 checks to see if the count is less than zero. If not, the count is incremented in block 24 and the request succeeds in block 25. If the count is less than zero, a consumer process is waiting on the wait queue (see block 16 of FIG. 1), and block 26 dispatches the consumer process and allows it to complete successfully in block 13. The count is incremented by one in block 24 and the producer request completes successfully in block 25.

Figure 3:
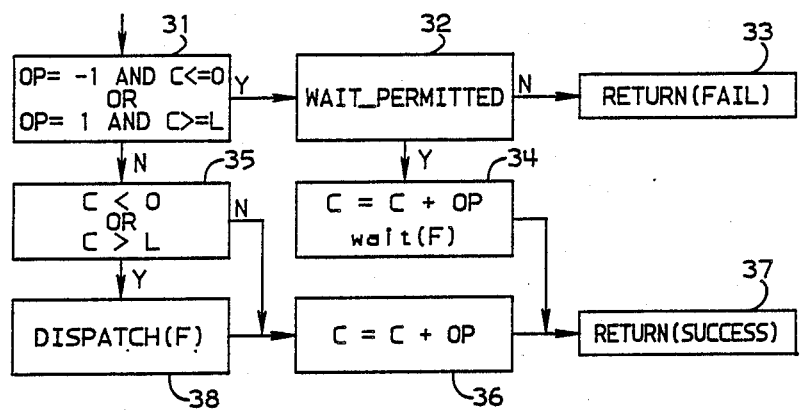
FIG. 3 shows a block diagram of the fullphore S operation of the subject invention.

FIG. 3 shows a block diagram of the fullphore "S" operation of the subject invention. The fullphore combines the "P" and "V" operations of a semaphore into a single "S" operation capable of handling both consumer processes and producer processes. A fullphore has a count, a limit, a queue for waiting processes, a WAIT_PERMITTED flag, and a OP (operation) flag. The operation flag determines whether the count is incremented or decremented by one. The architecture of the fullphore "S" operation is s(F, OP, WAIT_PERMITTED), where F is the fullphore to be operated upon, OP is +1 for a producer process and −1 for a consumer process, and WAIT_PERMITTED is YES if the process will wait if necessary and NO if it will not.

When a fullphore receives a consumer process request (indicated by OP = −1), it first checks to see if the count is less than or equal to zero in block 31. If so, block 32 checks to see if the WAIT_PERMITTED flag was YES or NO. If the flag was NO, the request fails in block 33. If the WAIT_PERMITTED flag was YES, OP (−1) is added to the count in block 34, thereby decrementing the count. The process waits on the wait queue until dispatched by a producer process.

If the count is not less than or equal to zero, block 35 checks to see if the count exceeds the limit. If the count does not exceed the limit, OP (−1) is added to the count in block 36, thereby decrementing the count, and the request completes successfully in block 37. If the count is greater than the limit, indicating a waiting producer process, the waiting producer process is dispatched in block 38 and allowed to complete successfully. OP (−1) is added to the count in block 36 and the consumer request completes successfully in block 37. Note that the traditional semaphore architecture does not allow a producer process to wait for a consumer process. As described above, this situation is allowed in the fullphore architecture.

When a fullphore receives a producer process request (indicated by OP = +1), it first checks to see if the count is greater than or equal to the limit in block 31. If so, block 32 checks to see if the WAIT_PERMITTED flag was YES or NO. If the WAIT_PERMITTED flag was NO, the process fails in block 33. If the WAIT_PERMITTED flag was YES, OP (+1) is added to the count in block 34, thereby incrementing the count. The process waits on the wait queue until dispatched by a consumer process.

If the count is not greater than or equal to the limit, block 35 checks to see if the count is less than zero. If not, OP (+1) is added to the count in block 36, thereby incrementing the count, and the request completes successfully in block 37. If the count is less than zero, indicating a waiting consumer process, the consumer process is dispatched in block 38 and allowed to complete successfully. OP (+1) is added to the count in block 36 and the producer process is allowed to complete successfully in block 37.

The fullphore architecture greatly simplifies the operational interface between the fullphore and the processors of the multiprocessing system. A fullphore can be used anywhere a semaphore is used. In addition, a fullphore can be used in places where one semaphore is insufficient. A particularly good application for the fullphore is to synchronize access to a ring buffer. A ring buffer is used to house information as it is passed from an information producer to an information consumer. If the consumer can process the information faster than the producer provides it, the consumer must wait. Likewise, if the producer produces the information faster than the consumer processes it, then the producer must wait, because the ring buffer becomes full, and cannot hold any more unprocessed information.

A single fullphore with a limit set equal to the number of pieces of information that can be held in the ring buffer and an initial count of zero will provide the required synchronization. The count represents the number of pieces of information in the ring buffer. The producer increments the count, waiting if the buffer is full, and the consumer will decrement the count, waiting if the buffer is empty. In order to accomplish this synchronization with only semaphore support requires three semaphores' one to serve as a Monitor, and two to support the wait mechanism for buffer full and buffer empty conditions. The Monitor is needed to synchronize changes to the two semaphores, since those changes must be made atomically. The fullphore needs no Monitor, since only one synchronization object does it all.

Another use for a fullphore is to implement a parameterless ADA rendezvous. An ADA rendezvous is characterized by a single execution thread diverging into two threads, and the rendezvous occurs when the two threads have completed and the threads converge back into a single thread. By initializing a fullphore with a limit of zero and a count of zero, and having thread one request an increment operation on the fullphore and thread two request a decrement operation, the rendezvous will occur when both threads have completed. Which ever thread completes first will wait, since COUNT=LIMIT=0. The thread which completes second will not only not wait, but will dispatch the first thread ending its wait. The ADA rendezvous supports parameters passing at rendezvous time—this support could be added with enhancements to the fullphore invention.

To implement the rendezvous without a fullphore would require a Monitor semaphore again, to decide which thread completed first, and a second semaphore to allow the thread finishing second to dispatch the thread finishing first.

While the invention has been described with respect to a preferred embodiment, it will be understood by those skilled in the art that various changes in detail may be made therein without departing from the spirit, scope and teaching of the invention. Accordingly, the herein disclosed is to be limited only as specified in the following claims.

What is claimed is:

1. A fullphore for efficiently enforcing mutual exclusion between consumer tasks and producer tasks in a computer system, comprising:
 a count for incrementing and decrementing responsive to an operation flag;
 a limit imposed on said count; and
 a queue for waiting consumer tasks and producer tasks.

2. The fullphore of claim 1, wherein:
 a consumer task is placed on said queue if a wait permitted flag indicates a consumer task can wait and said count is less than or equal to zero.

3. The fullphore of claim 1, wherein a producer task is placed on said queue if a wait permitted flag indicates a producer task can wait and said count is greater than or equal to said limit.

4. A method of efficiently enforcing mutual exclusion between producer tasks and consumer tasks in a computer system having a fullphore comprising a count, a limit, and a wait queue, said system also having a fullphore operation comprising a wait permitted flag and an operation flag, said method comprising the steps performed by a computer of:

for a producer task:
 setting said operation flag to an incrementing state;
 forcing said producer task to fail if said count is greater than equal to said limit and said wait permitted flag is off;
 incrementing said count and allowing said producer task to wait on said wait queue if said count is greater than or equal to said limit and said wait permitted flag is on, wherein said producer task waits until dispatched by a dispatching step for a consumer task;
 incrementing said count and completing said producer task if said count is less than or equal to said limit;
 dispatching a waiting consumer task if said count is greater than said limit, then incrementing said count and completing said producer task;

for said consumer task:
 setting said operation flag to a decrementing state;
 forcing said consumer task to fail if said count is less than or equal to zero and said wait permitted flag is off;
 decrementing said count and allowing said consumer task to wait on said wait queue if said count is less than or equal to zero and said wait permitted flag is on, wherein said consumer task waits until dispatched by said dispatching step for said producer task;
 decrementing said count and completing said consumer task if said consumer task if said count is greater than or equal to zero;
 dispatching a waiting producer task if said count is less than zero, then decrementing said count and completing said consumer task.

* * * * *